(12) United States Patent
Noel

(10) Patent No.: US 7,923,288 B2
(45) Date of Patent: Apr. 12, 2011

(54) ZINC OXIDE THIN FILM ELECTROLUMINESCENT DEVICES

(75) Inventor: Jean-Paul Noel, Ottawa (CA)

(73) Assignee: Group IV Semiconductor, Inc., Ottawa, Ontario (CA)

( * ) Notice: Subject to any disclaimer, the term of this patent is extended or adjusted under 35 U.S.C. 154(b) by 302 days.

(21) Appl. No.: 12/207,734

(22) Filed: Sep. 10, 2008

(65) Prior Publication Data

US 2009/0001872 A1     Jan. 1, 2009

Related U.S. Application Data

(63) Continuation-in-part of application No. 11/971,566, filed on Jan. 9, 2008.

(60) Provisional application No. 60/971,373, filed on Sep. 11, 2007.

(51) Int. Cl.
*H01L 21/00* (2006.01)

(52) U.S. Cl. .......................................... 438/104; 438/45

(58) Field of Classification Search ........................ None
See application file for complete search history.

(56) References Cited

U.S. PATENT DOCUMENTS 5,721,562 A    2/1998   Kawashima et al. ........... 345/76

FOREIGN PATENT DOCUMENTS

| CA | 2635303 | 7/2007 |
| CA | 2635307 | 7/2007 |
| EP | 0818943 | 2/2005 |
| JP | 2000068560 | 3/2000 |

OTHER PUBLICATIONS

Y. Ono, "Electroluminescent Displays", World Scientific, 1995.
"Handbook of Electroluminescent Materials", editor D.R. Vij, pp. 36-37, Institute of Physics Publishing, 2004.

*Primary Examiner* — Scott B Geyer
(74) *Attorney, Agent, or Firm* — Teitelbaum & MacLean; Neil Teitelbaum; Doug MacLean

(57) ABSTRACT

A thin film electro-luminescent device (TFEL) includes an active layer made of a direct bandgap semiconductor material, e.g. zinc oxide, doped with exciton binding centers, such as aluminum, in small amounts, e.g. 0.001 at % to 30.0 at %. The exciton binding centers prevent free excitons, created by impact ionization, from diffusing toward and recombining at native defect centers. To provide a columnar structure, a polycrystalline seed layer is deposited first to provide a template, followed by the deposition of an overlying layer forming columns in accordance with the template.

20 Claims, 7 Drawing Sheets

ZINC OXIDE THIN FILM ELECTROLUMINESCENT DEVICES

The present application claims priority from U.S. Patent Application 60/971,373 filed Sep. 11, 2007, which is incorporated herein by reference for all purposes. The present application is also a continuation in part of U.S. patent application Ser. No. 11/971,566 filed Jan. 9, 2008, which is incorporated herein by reference for all purposes.

TECHNICAL FIELD

The present invention relates to thin film electro-luminescent device including an active layer structure comprising a direct-bandgap semiconductor material, such as a zinc-oxide (ZnO) or a ZnO alloy, with a dopant for populating the direct bandgap semiconductor material with free-exciton binding centers in concentrations above native defect concentration, and in particular to an active layer structure comprising a seed layer and an overlying layer.

BACKGROUND OF THE INVENTION

The traditional approach for design and manufacture of thin film electro-luminescent (TFEL) devices and displays is to incorporate zinc sulphide (ZnS) as the emissive phosphor layer, interposed between two dielectric layers and operated with electric fields of approximately 2 MV/cm, using an ac drive voltage with a frequency of approximately 1 kHz. Typically, the ZnS is activated optically with activator atoms, e.g. manganese (Mn) or rare earth atoms, to achieve intra-atomic transitions by impact excitation, thus creating light in the visible spectrum corresponding to the electron level configuration of the impurity atoms (Mn or rare earth). According to Y. Ono in a paper entitled "Electroluminescent Displays", published in World Scientific, 1995, no known emission due directly to ZnS (bandgap of 3.6 eV, or 344 nm) has ever been reported in TFEL devices. Space charge separation during impact ionization is cited as the limiting factor in "Handbook of Electroluminescent Materials", editor D. R. Vij, pp 36-37, Institute of Physics Publishing, 2004, hence the need to incorporate activator atoms.

Zinc oxide (ZnO) is a multifunctional semiconductor material which has been used in various areas, including phosphors, piezoelectric transducers, surface acoustic wave devices, gas sensors, and varistors. With a band gap of approximately 3.3 eV, ZnO is similar to that of Gallium Nitride (GaN), but with a higher free-exciton binding energy of 60 meV, compared to 25 meV for GaN, thereby favoring efficient free-exciton emission at room temperature. Free-excitons are coupled electron-hole pairs not bound to anything else other than themselves, i.e. they are perfect electric dipoles. In a semiconductor, they are equivalent to efficiently stored potential (light) energy, akin to a "light capacitor". The high free-exciton binding energy in ZnO means that free-excitons can exist in ZnO at temperatures up to approximately 700° K., or 430° C., at which point they begin to "boil" apart and free-exciton recombination can no longer occur. Accordingly, ZnO is a promising material for light emitting devices that are both efficient and practical at room temperature. In comparison, the low free-exciton binding energy in GaN, i.e. 25 meV, results in the free-excitons "boiling" apart at or below room temperature, making GaN unsuitable for free-exciton light emission.

Another important property of ZnO is its high optical transmittance in the visible and near ultra-violet (UV) regions, even when it is doped with certain atoms, e.g. Aluminum (Al), which are used to increase the electrical conductivity of the zinc oxide film, thereby forming a transparent conducting oxide (TCO). Indium-tin oxide (ITO) is currently the industry standard for TCO material in flat panel displays, solar cells, etc; however, the global supply of indium metal is limited, thereby causing the price for the refined form of indium to be considerably higher than zinc, e.g. US$700/kg cf. for indium compared to US$4.00/kg for Zn, as of December 2006. Many leading electronics designers and manufacturers, e.g. Samsung, therefore have active development programs that aim to replace ITO with alternative TCO's, such as ZnO.

Zinc-oxide films have been synthesized by numerous methods, such as metal-organic chemical vapor deposition, molecular beam epitaxy, magnetron sputtering, pulsed laser deposition, atomic layer deposition, spray pyrolysis. Low temperature deposition is required in most flat-panel processes in order to avoid reactive and elemental diffusion of different layers and to protect substrates, such as polymers. Among these methods, ZnO films can be synthesized at temperature as low as 100° C. by metal-organic chemical vapor deposition and atomic layer deposition, and even at room temperature by magnetron sputtering and pulsed laser deposition. The high kinetic energies of growing precursors in the last two methods are believed to play a key role in the realization of low temperature deposition critical to the flat panel display industry.

The required material properties for producing ZnO films suitable as an efficient light emitter, as opposed to a TCO, are more stringent, which has hampered the development of ZnO light emitters. Specifically, the main issue has been the formation of undesirable native defects in ZnO, e.g. vacancies and interstitials of both Zinc and Oxygen atoms, which are deep-level defects that reduce the efficiency of emission at the bandgap energy by trapping the free excitons and substantially reducing the energy of any subsequent radiative emission, or favoring non-radiative emission, i.e. stored bandgap energy is lost to other undesirable pathways such as heat. Reducing (during process) and maintaining (post-process) the undesirable deep-level defect concentration to low values, while simultaneously providing (during process) an appropriate concentration of desirable shallow optical binding centers to prevent the free excitons from migrating to the deep-level defects, are the key elements needed to enable bandgap (or near bandgap) radiative recombination to dominate.

An object of the present invention is to overcome the shortcomings of the prior art by providing an electro-luminescent structure comprising a direct-bandgap semiconductor material, such as including zinc oxide, doped with exciton binding centers, while reducing the concentration of deep-level defects and controlling the concentration of shallow optical binding centers.

SUMMARY OF THE INVENTION

Accordingly, the present invention relates to a thin film electro-luminescent (TFEL) device comprising:
a substrate;
an active layer structure comprised of a seed layer of a polycrystalline direct bandgap semiconductor material doped with exciton binding centers supported by the substrate and forming a template, and an overlying columnar layer of direct bandgap semiconductor doped with exciton binding centers disposed on the template; and
electrodes for applying an electric field to the active layer.

Accordingly, the present invention relates to a method of fabricating a thin film electro-luminescent (TFEL) device comprising the steps of:

a) providing a substrate;

b) depositing an active layer of zinc oxide doped with exciton binding centers on the substrate; and c) mounting electrodes on either side of the active layer for applying an electric field thereto;

wherein step b) comprises: depositing a seed layer of zinc oxide doped with exciton binding centers forming hexagonal grains; and depositing an overlying layer of zinc oxide doped with exciton binding centers that grows in a columnar structure using the underlying seed layer as a template.

BRIEF DESCRIPTION OF THE DRAWINGS

The invention will be described in greater detail with reference to the accompanying drawings which represent preferred embodiments thereof, wherein:

FIG. 1b is a cross-sectional view of an active layer of the EL device of FIG. 1a;

DETAILED DESCRIPTION

Figure 1A:
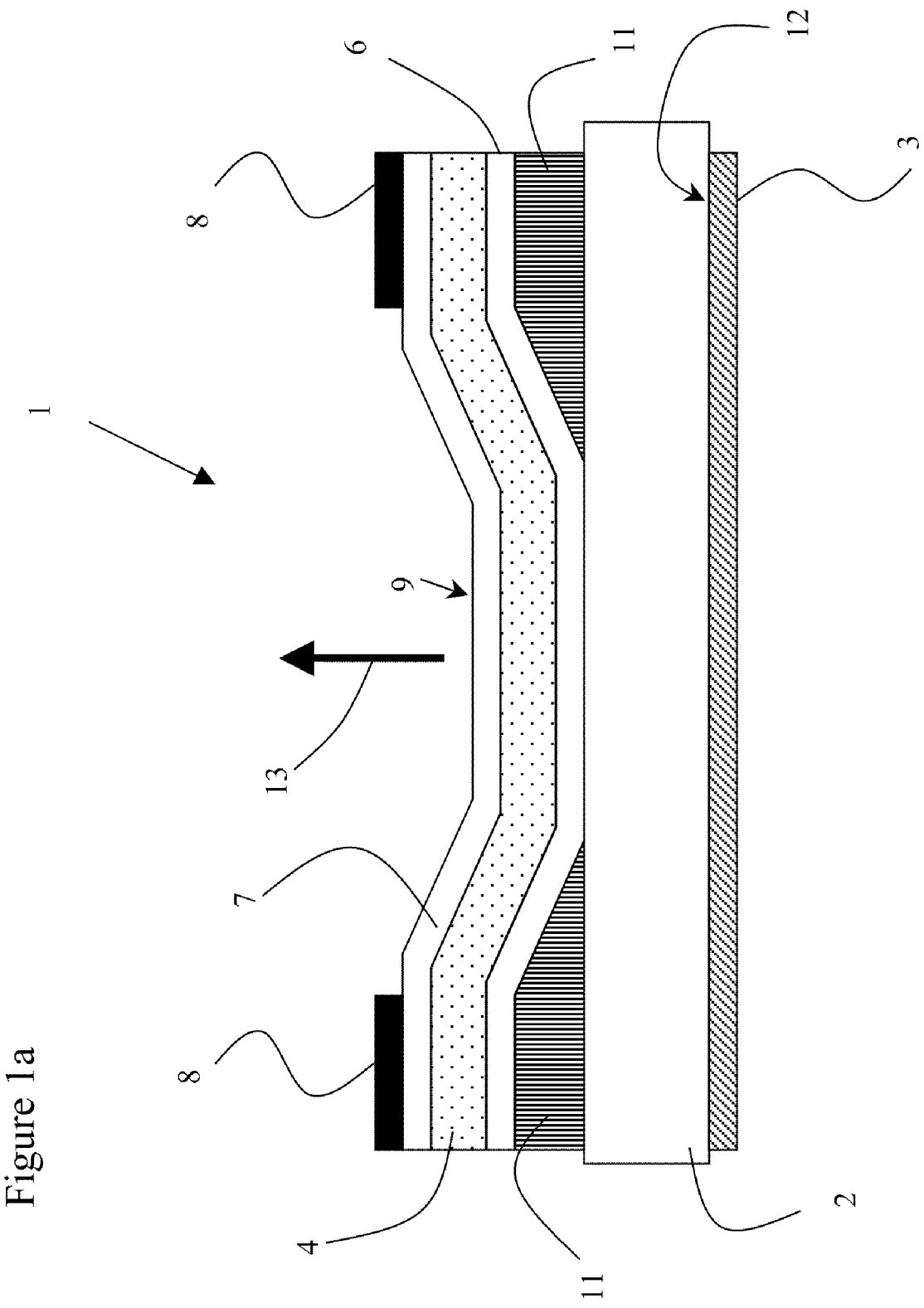
FIG. 1a is a cross-sectional view of an electro-luminescent device in accordance with the present invention.

The present invention relates to a new class of thin film electro-luminescent (TFEL) devices using a direct-bandgap semiconductor material, such zinc oxide (ZnO) or a ZnO alloy, e.g. with beryllium, cadmium and magnesium, as the emissive layer, which has been designed, fabricated and operated to produce near-band-edge ultra-violet (UV) emission of high spectral purity, e.g. exhibiting peak emission at ~385 nm (3.22 eV) and a peak width of ~200 meV at half maximum, and a radiometric power of ~10 $\mu W/cm^2$.

The UV emission mechanism from ZnO is excitonic in nature, and not related to intra-atomic transitions caused by impact excitation, as in traditional TFEL. Since impact excitation (with relatively low cross-section) is not involved in the present ZnO TFEL devices, and the radiative lifetime of excitons in ZnO is only 300 p.s., compared with approximately 2 ms for Mn and rare earth atoms in ZnS, the near-band emission from ZnO TFEL devices has the potential to achieve significantly higher optical output power and higher power conversion efficiency than traditional ZnS-based TFEL devices. Moreover, the high binding energy, i.e. approximately 60 meV, of excitons in ZnO gives higher probability of exciton formation by impact ionization in a high-field regime. The high binding energy of excitons in ZnO likely explains why UV emission from ZnS TFEL's has not been reported, i.e. since the ZnS exciton binding energy is only 35 meV. Electron-hole pairs created by high-field impact ionization in ZnS are pulled apart, toward the anode and cathode, respectively, before they have a chance to bind and form stable excitons. Consequently, the conversion of hot electron energy to light energy can only be achieved in ZnS with the addition of the activator atoms, thereby enabling impact excitation of the activator atoms by hot electrons, which are created by impact ionization of the ZnS.

In the excitonic process within the ZnO TFEL, a fraction of the electron-hole pairs created by impact ionization do not get separated by the high field, owing to their strong mutual attraction, i.e. a binding energy of approximately 60 meV. The electron-hole pairs form excitons, which can be thought of as stored light energy or a "light capacitor". The excitons in ZnO annihilate with a half-life of 300 p.s. to create UV photons. Given sufficient crystal quality, the exciton annihilation process can be close to 100% efficient, since ZnO is a direct bandgap semiconductor, i.e. phonons are not required to participate in the exciton annihilation process.

Since free excitons are electric dipoles, their center-of-mass motion is not affected by electric fields within the device structure. The center-of-mass motion of free excitons is governed instead by local energy gradients formed by alloy bandgap fluctuations and gradations (whether they are engineered or naturally-occurring), surface states, and points defects, such as donor or acceptor impurities, which can capture and bind the electron or the hole comprising the free exciton with a binding energy less than the energy required to dissociate the free exciton, e.g. approximately 60 meV for ZnO. When the emission mechanism of a high-field TFEL is excitonic, it should therefore exhibit inherently higher optical output power and power conversion efficiencies. Compare the linear processes: [ZnO impact ionization→ZnO exciton emission] versus [ZnS impact ionization→hot electron impact excitation of Mn or rare earth atoms] for the traditional TFEL approach.

The high binding energy of ZnO excitons, e.g. approximately 60 meV, or 430° C. thermal equivalent, also permits efficient TFEL operation well above room temperature, which is in contrast to other direct-gap semiconductors, such as GaN with a binding energy of 25 meV, or 20° C., and ZnS with a binding energy of 35 meV, or 137° C., in which excitons, even if they are formed with higher probability in a lower-field environment, could not exist due to dissociation at high temperature.

With reference to FIG. 1a, an electro-luminescent device 1 in accordance with the present invention includes a conducting substrate 2, preferably comprising silicon, with a metal contact layer 3 supported on one side thereof. An active layer 4 formed from a direct-bandgap semiconductor material, such as a zinc-oxide (ZnO) or a ZnO alloy ZnO, ideally between 10 nm and 1000 nm thick, is supported on the other side of the substrate 2, sandwiched between an insulating dielectric layer 6 and a transparent electrode layer 7. An additional dielectric layer (not shown) can be disposed between the active layer 4 and the electrode layer 7. Metal contacts 8 mounted on opposite sides of the electrode layer 7, forming a light emitting well 9 therebetween, enable an electrical field to be applied to the active layer 4, and in particular to the active layer 4 in the light emitting well 9.

The light emitting wells 9 are isolated from the conducting portions of the substrate 2 by field dielectric regions 11 disposed directly below the metal contacts 8. By placing the field dielectric regions 11 below the metal contacts 8, there is no current injection directly under the metal contacts 8 as the underlying thick field oxide regions 11, represents a barrier to current flow. Accordingly, an optically active region of the active layer structure 4, wherein any current injection via the transparent electrode layer 7 contributes to the generation of light, is confined only to the light emitting well 9, between the field dielectric regions 11.

In an exemplary embodiment, the dielectric layer 6 is 1 μm thick and comprised of silicon dioxide ($SiO_2$), but other dielectric layers and thicknesses, e.g. between 2 nm and 10 μm are feasible. Silicon nitride ($Si_3N_4$) prepared by low pressure chemical vapor deposition, is more suitable than $SiO_2$ due to the lower diffusion constant of Zn, thereby reducing void formation at the ZnO-dielectric interface due to high temperature processing; however, aluminum oxide, yttrium oxide, and haffiium oxide are some other possibilities for the dielectric layer 6. The dielectric layer 6 protects the active layer 4 from the electrodes 3 and 7 and from the conductive substrate 2, and has the ability to change the electron energy distribution of hot electrons passing therethrough, i.e. cooling the electrons.

A reflective layer 12 can be provided between the substrate 2 and the contact layer 3, if the substrate 2 is transparent, or between the substrate 2 and the dielectric layer 6, to reflect light back through the active layer 4 and out the top of the well 9, as shown by arrow 13, to ensure maximum light emission efficiency of the device 1.

The active layer 4 is doped with exciton binding centers between 0.001 at % and 30 at %, preferably 0.1 to 1 atomic percent, and most preferably 0.4 atomic percent, in order to provide optical binding centers to the free excitons when they are formed. The exciton binding centers prevent free excitons from diffusing toward and recombining at native defect centers, e.g. Zn and O vacancies and interstitials, which are known to be in relatively high equilibrium concentrations even in good-quality ZnO due to the high bandgap energy. The exciton binding centers are one or more of the elements selected from the group consisting of boron, aluminum, gallium, indium, thallium, nitrogen, phosphorous, arsenic, antimony, and bismuth, but preferably aluminum as herein described.

Figure 1B:
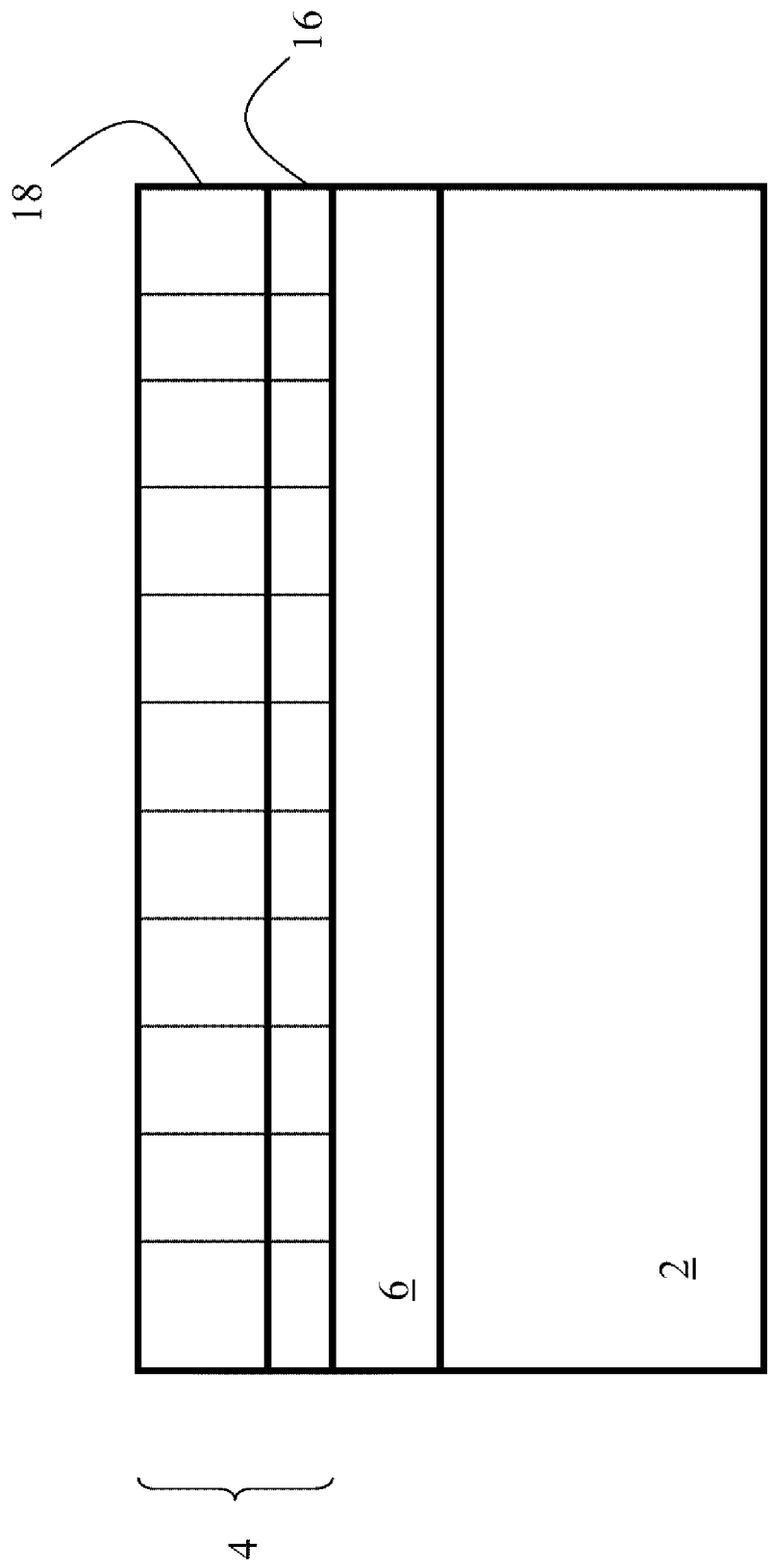

With reference to FIG. 1b, the device 1, illustrated without the electrode structures, includes the active layer 4 comprised of a stack made up of 1) a relatively thin seed layer 16, having a thickness of between 5 nm and 200 nm, of a direct-bandgap semiconductor material, such as a zinc-oxide (ZnO) or a ZnO alloy, doped with exciton binding centers, such as aluminum, deposited, e.g. by a spin-on process, to form hexagonal grains, and 2) an overlying layer 18 of the direct-bandgap semiconductor material, e.g. zinc oxide, doped with exciton binding centers, e.g. aluminum, e.g. deposited by a sputter process. The overlying layer 18 has a thickness greater than the seed layer 16, e.g. more than 5 nm to 800 nm, and limited only by film stress and adhesion considerations, which grows in a columnar structure using the underlying seed layer 16 as a template.

Figure 1C:
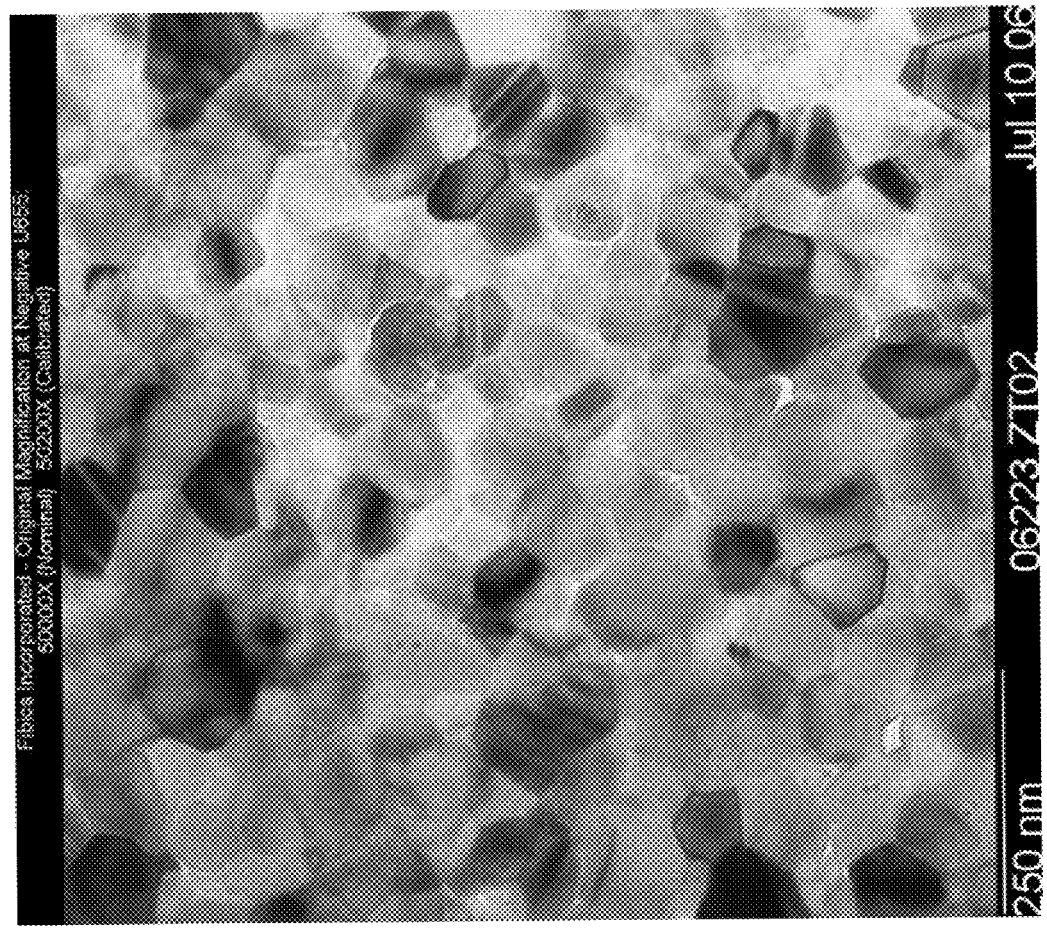
FIG. 1c is a transmission electron micrograph in plan view for a ZnO seed layer.

The micrograph, of FIG. 1c, clearly shows the hexagonal nature of the ZnO seed layer 16. The dark grains are ones in which the crystal axis is a few degrees off normal, which causes the electron diffraction condition during imaging to be changed. The parallel lines seen in some grains is a type of crystal defect called "twinning", which is further proof of the single crystal nature of the individual grains in the seed layer 16.

The process will work only for a seeded structure, since a columnar structure cannot be "annealed" into existence when the entire stack 4 has already been deposited. The key is the columns are formed as-grown, due to the presence of the seed layer 16 having atomic steps, following a high temperature anneal, e.g. 900° C. and 1200° C.

The columnar structure of the active layer stack 4 is essential to efficient device operation. The device 1 works by generating a plurality of electrons by impact ionization to start the process of exciton formation. If the linear path of electron travel within a single column is interrupted with grain boundaries, such as for a non-columnar structure, then the energetic electrons will encounter defects at the boundaries, reducing efficiency. In other words, the single path traced by an electron, and the hundreds of new electrons it generates by impact ionization, should remain in single crystal material, i.e. one column, throughout its acceleration in the high electric field, which can only be achieved with a columnar structure 18 in the active layer 4.

The electrode layer 7 is preferably a transparent conducting oxide (TCO) comprised of zinc oxide doped with aluminum (ZnO:Al), which is deposited by sputtering at temperatures less than approximately 400° C. so as to retain its electrical conductivity. Alternatively, the transparent electrode layer 7 can be other TCO's, such as indium tin oxide (ITO) The high electron concentration provided by the TCO provides a significant source of electrons to initiate impact ionization in the active layer 4 when the field strength reaches threshold during bipolar operation.

The contact layer 3 and the metal contacts 8 are preferably comprised of aluminum, and are approximately 0.5 µm thick with a sheet resistance and specific contact resistance of approximately 40 $\Omega/\square$ and 3E-4 $\Omega cm^2$, respectively.

Figure 2A:
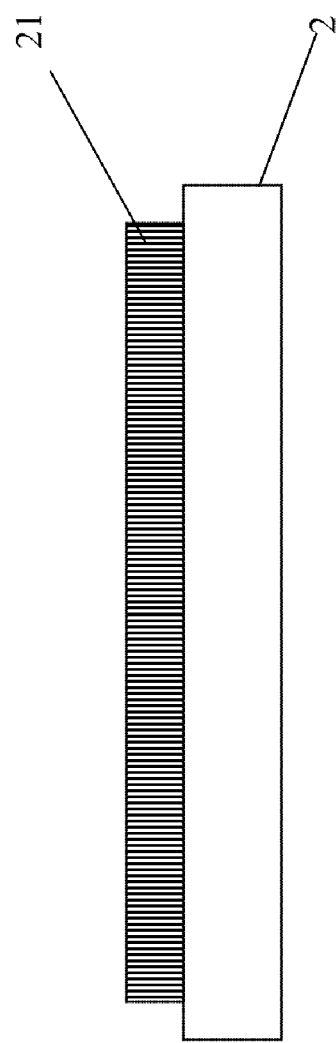
FIGS. 2a to 2f illustrate the fabrication method in accordance with the present invention.
Figure 2B:
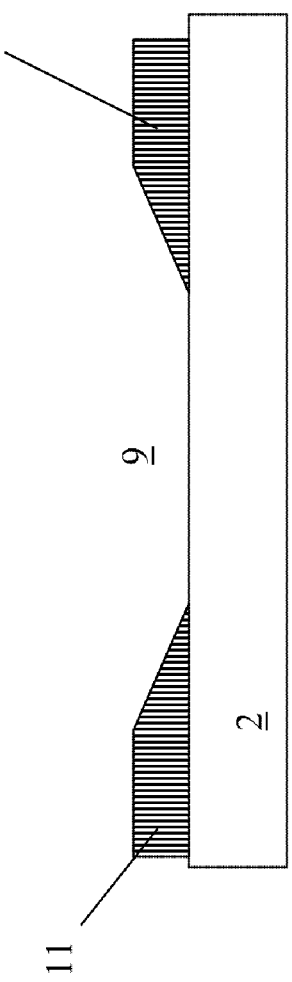
Figure 2C:
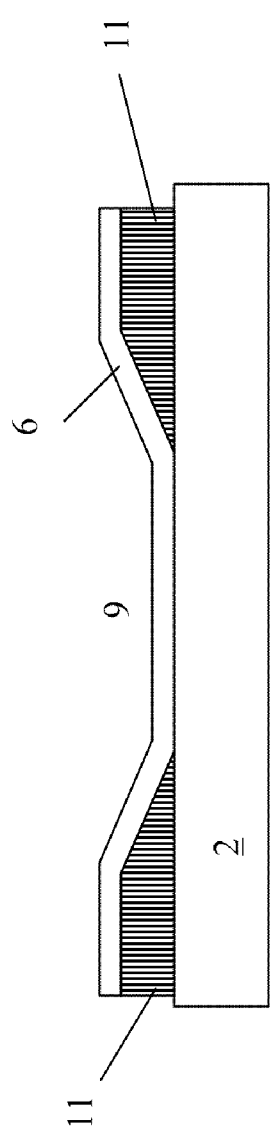
Figure 2D:
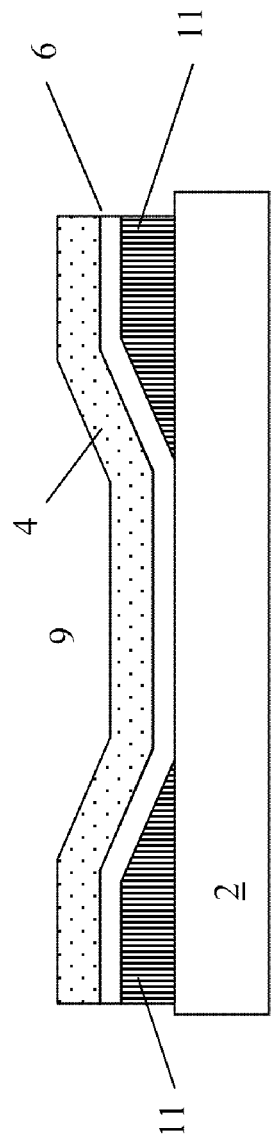
Figure 2E:
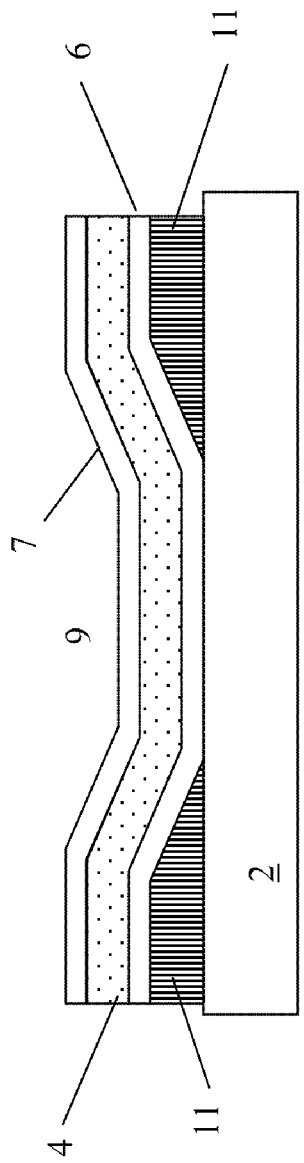
Figure 2F:
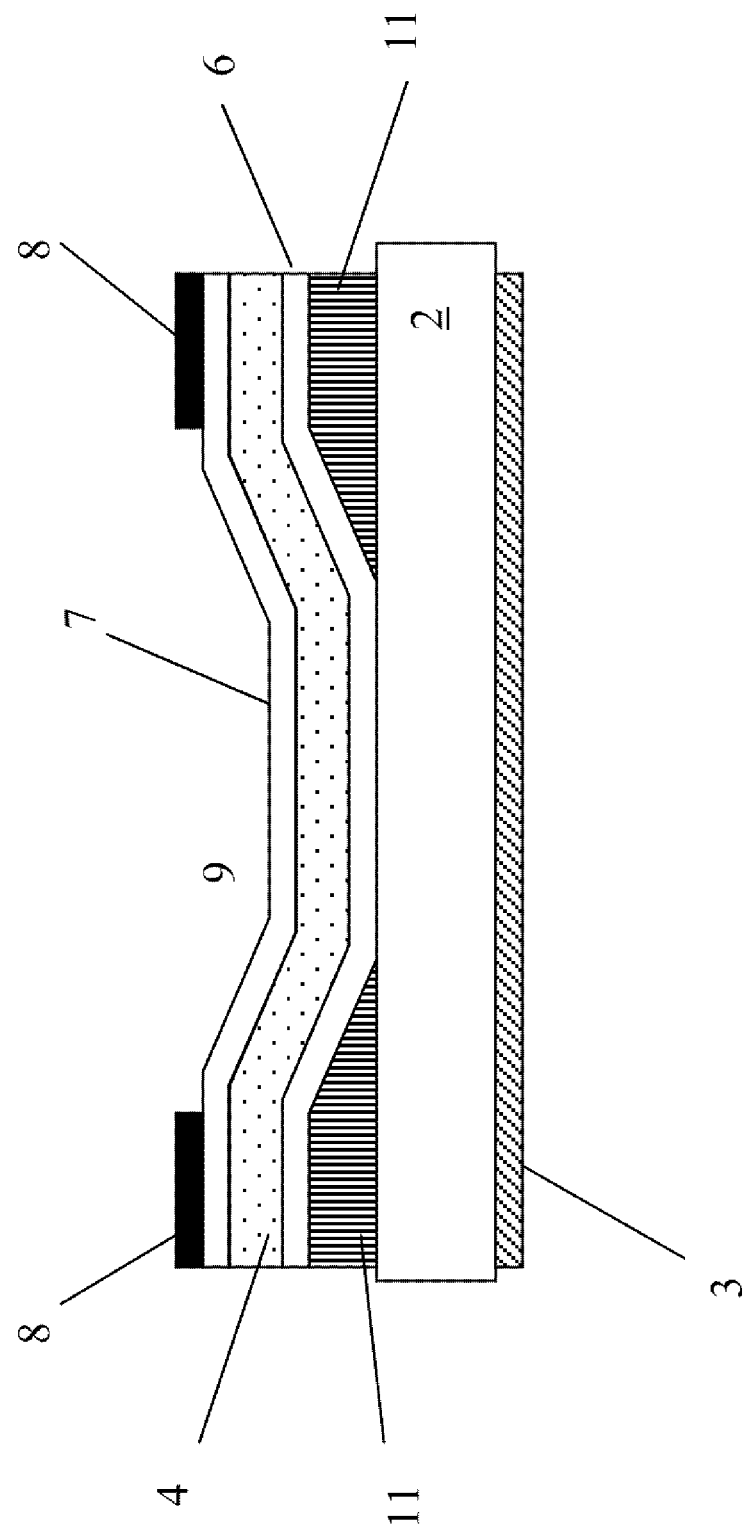

A process for manufacturing the device 1 of FIG. 1a which emits UV light 13, includes first providing the substrate 2, and then depositing a layer of field dielectric material 21 thereon (FIG. 2a). In the next step, a portion of the field dielectric layer 21 is removed forming the field dielectric regions 11 and creating the device well area 9 (FIG. 2b). The deposition and removal steps for the field dielectric layer 21 can be replaced by a single step involving deposition of separate field dielectric regions 11. Then the dielectric layer 6, the active layer 4 and the electrode layer 7 are deposited in sequence, as in FIGS. 2c, 2d and 2e, respectively. Silicon nitride ($Si_3N_4$) or silicon dioxide ($SiO_2$) can be used for the dielectric layer 6; however, $Si_3N_4$, prepared by low pressure chemical vapor deposition, is the preferred method, due to the lower diffusion constant of Zn, thereby reducing void formation at the ZnO-dielectric interface due to high temperature processing. Other deposition methods include plasma-enhanced chemical vapor deposition, sputtering, and e-beam evaporation. The field dielectric regions 11 and the dielectric layer 21 can be omitted, if desired.

The seed layer 16, in the active layer stack 4, is ideally a polycrystalline direct bandgap semiconductor, e.g. ZnO, layer doped with exciton binding centers, e.g. Al, deposited by a spin-on process to form hexagonal grains, and the overlying, e.g. ZnO:Al, layer 18 is deposited using a sputter process that grows in a columnar structure using the underlying seed layer 16 as a template.

The process of seeded ZnO columnar growth during sputtering of the overlying layer 18 can occur without intentional wafer heating in the sputter deposition equipment, i.e. the process occurs at or near room temperature or approximately 20° C. (between 15° C. and 25° C.). High-temperature annealing, e.g. between 900° C. and 1200° C., following deposition of active layer 4, produces single-crystal columns with the level of crystalline quality required to obtain efficient electron-hole pair generation during impact ionization, with subsequent exciton formation and recombination, as shown in the TFEL device output in FIG. 3.

Preferably, the transparent conducting oxide (TCO) layer 7 is also ZnO:Al deposited onto the active layer 4 by sputtering, but not subsequently annealed at high temperature, so as to retain its electrical conductivity. Preferably, the anneal temperature of the ZnO:Al TCO layer is less than 400° C. Finally, the contact layer 3 and the upper metal contacts 8 are mounted on the substrate 2 and TCO layer 7, respectively. The second dielectric layer can be deposited between the active layer 4 and the electrode layer 7, if desired.

Figure 3:
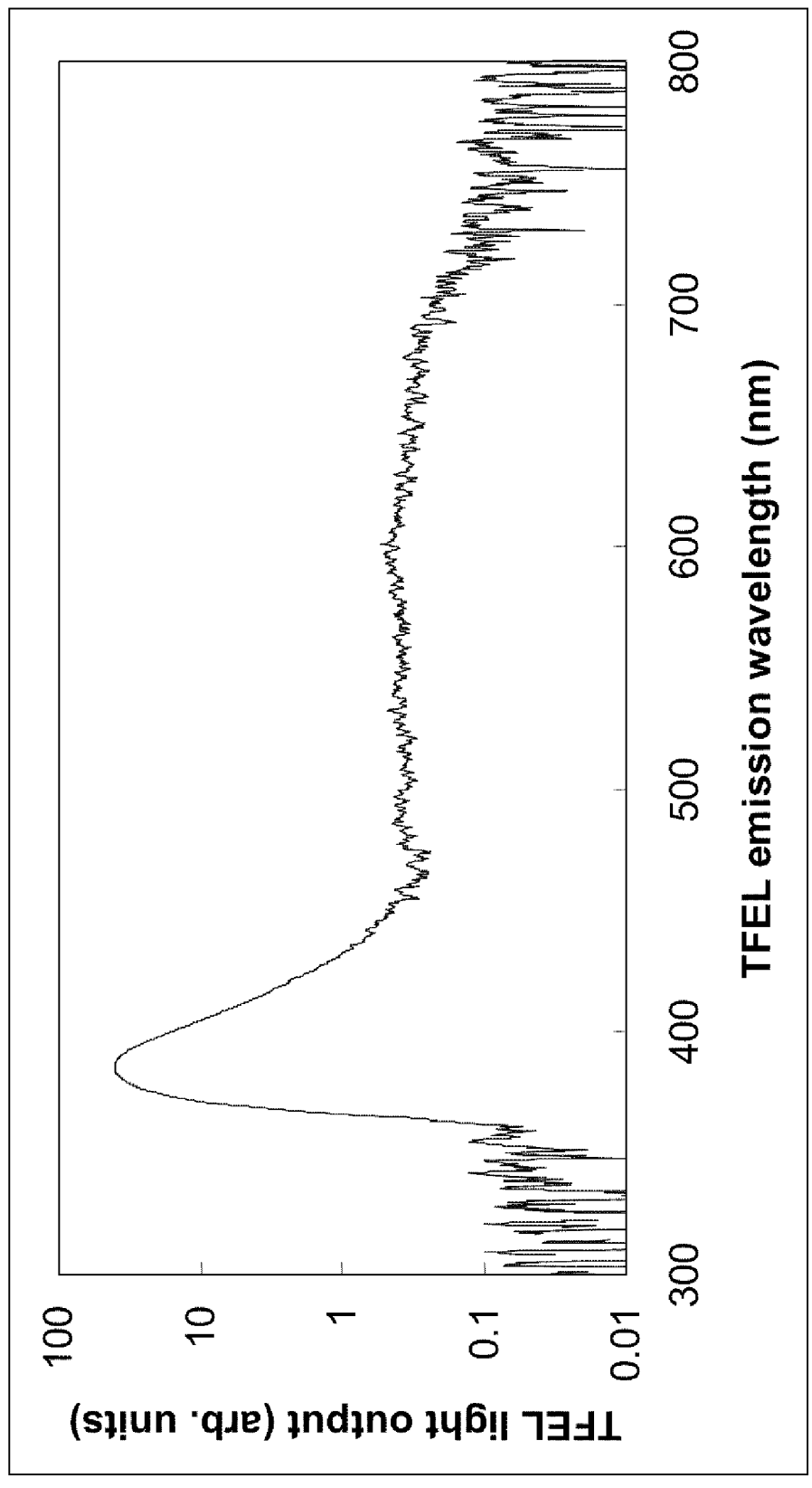
FIG. 3 is a plot of light output vs. wavelength for the device of FIGS. 1a and 1b.

FIG. 3 illustrates an electro-luminescent (EL) spectrum (semi-log scale) of a TFEL device 1 operated with a 200 kHz 150V square wave drive. The area of the device well 9 was $4.4\times10^{-4}$ $cm^2$. A radiometric power output of approximately 10 µW/$cm^2$ was measured using a calibrated UV source (deuterium) as a reference. The intensity ratio of the near-bandedge emission (387 nm peak wavelength) to native defect emission in the middle of the bandgap is >80:1, indicating high spectral purity.

I claim:

1. A method of fabricating a thin film electro-luminescent (TFEL) device comprising:
   a) providing a substrate;
   b) depositing an active layer of zinc oxide doped with exciton binding centers on the substrate; and
   c) mounting electrodes on either side of the active layer for applying an electric field thereto;
   wherein step b) comprises: depositing a seed layer comprised of zinc oxide doped with exciton binding centers forming hexagonal grains; and depositing an overlying layer comprised of zinc oxide doped with exciton binding centers that grows in a columnar structure using the underlying seed layer as a template.

2. The method in accordance with claim 1, wherein the seed layer is comprised of polycrystalline zinc oxide or zinc oxide alloy doped with exciton binding centers.

3. The method in accordance with claim 2, wherein the overlying layer is comprised of columnar zinc oxide or zinc oxide alloy disposed on the polycrystalline zinc oxide seed layer.

4. The method in accordance with claim 1, wherein exciton binding centres in the active layer has doping concentration of from 0.001 at % to 30 at %.

5. The method in accordance with claim 1, wherein exciton binding centres in the active layer has doping concentration of from 0.1 at %. to 1 at %.

6. The method in accordance with claim 1, wherein the exciton binding centers are one or more of the elements selected from the group consisting of boron, aluminium, gallium, indium, thallium, nitrogen, phosphorous, arsenic, antimony, and bismuth.

7. The method in accordance with claim 1, wherein the active layer is from 10 nm to 1000 nm thick.

8. The method in accordance with claim 1, wherein the electrodes include a transparent conducting layer.

9. The method in accordance with claim 8, wherein the transparent conducting layer is comprised of aluminium zinc oxide.

10. The method in accordance with claim 8, wherein the electrodes include metallic contacts mounted on the transparent conducting layer; and further comprising field dielectric regions disposed on the substrate beneath the metallic contacts inhibiting current injection directly under the metal contacts forming a device well therebetween from which light is emitted.

11. The method in accordance with claim 1, further comprising an insulating dielectric film disposed on at least one side of the active layer.

12. The method in accordance with claim 11, wherein the insulating dielectric film has a thickness ranging from 2 nm to 10 μm.

13. The method in accordance with claim 11, wherein the insulating dielectric film is comprised of one or more of the materials selected from the group consisting of silicon nitride, aluminum oxide, silicon dioxide, yttrium oxide, and hafnium oxide.

14. The method in accordance with claim 11, wherein the insulating dielectric film is comprised silicon nitride ($Si_3N_4$), thereby reducing void formation at an interface between the active layer and the insulating dielectric film.

15. The method according to claim 1, wherein the seed layer is deposited using a spin-on process.

16. The method according to claim 1, wherein the overlying layer is deposited using a sputtering process at between 15° C. and 25° C.

17. The method according to claim 1, wherein step b) further comprises:
   annealing the seed and overlying layers at a temperature between 900° C. and 1200° C.

18. The method according to claim 1, further comprising depositing an insulating dielectric layer between the active layer and the substrate.

19. The method according to claim 18, wherein the insulating dielectric film is comprised silicon nitride ($Si_3N_4$) prepared by low pressure chemical vapor deposition, thereby reducing void formation at an interface between the active layer and insulating dielectric film due to high temperature processing and a lower diffusion constant of zinc.

20. The method in accordance with claim 1, wherein the electrodes include a transparent conducting layer, and metallic contacts mounted on the transparent conducting layer; and
   wherein the method further comprises providing field dielectric regions on the substrate beneath the metallic contacts forming a device well therebetween from which light is emitted.

* * * * *